No. 796,930. PATENTED AUG. 8, 1905.
P. W. PRATT.
RUBBER TREAD.
APPLICATION FILED JULY 19, 1904.
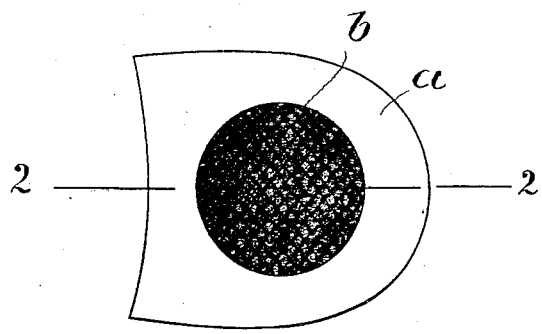
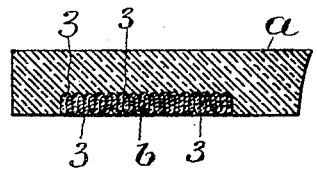
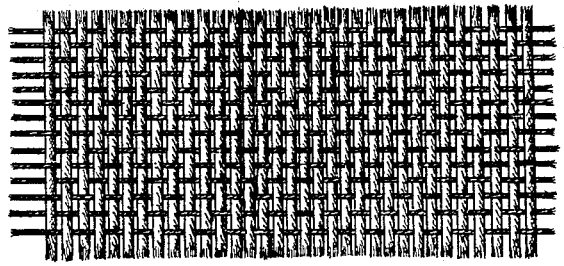
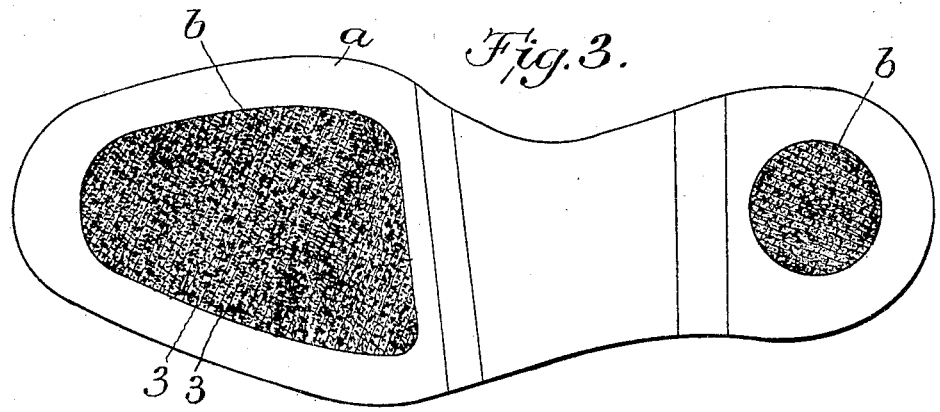
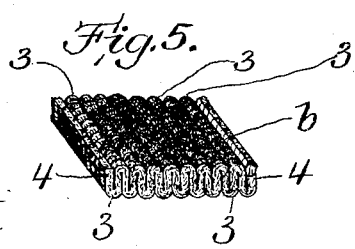
Witnesses:
O. W. Pezzetti
E. Batchelder
Inventor.
P. W. Pratt
by Wright Brown Quinby
Attys.

UNITED STATES PATENT OFFICE.

PHILIP W. PRATT, OF BOSTON, MASSACHUSETTS.

RUBBER TREAD.

No. 796,930.　　　Specification of Letters Patent.　　　Patented Aug. 8, 1905.

Application filed July 19, 1904. Serial No. 217,271.

*To all whom it may concern:*

Be it known that I, PHILIP W. PRATT, of Boston, in the county of Suffolk and State of Massachusetts, have invented certain new and useful Improvements in Rubber Treads, of which the following is a specification.

This invention relates to rubber treads, such as are employed on boot heels and soles, and particularly to rubber treads which are reinforced to increase the durability of the tread-surface and decrease its liability to slip.

Rubber treads are at present commonly reinforced by plugs or layers of fabric formed by winding a sheet of fabric into a roll of cylindrical or other form and cutting the roll crosswise into sections, each of which constitutes a reinforcing-plug which is inserted in the rubber body before vulcanization and united to the body by the vulcanizing process, the fabric being frictioned or treated with a solution of unvulcanized rubber, so that its convolutions are united by vulcanization. The said plug is therefore composed of layers or convolutions connected with each other only by the intervening rubber and having its top and bottom surfaces formed by severed ends of the fabric threads.

My invention has for its object to provide a reinforcement or plug adapted to be more firmly attached by vulcanization to the rubber body and of greater durability and strength than heretofore, besides being less liable to slip.

The invention consists in the improvement, which I will now proceed to describe and claim.

Of the accompanying drawings, forming a part of this specification, Figure 1 represents a bottom view of a heel-shaped rubber tread embodying my invention. Fig. 2 represents a section on line 2 2 of Fig. 1. Fig. 3 represents a bottom view of a sole-shaped tread. Fig. 4 represents a piece of the fabric of which my improved reinforce is made. Fig. 5 represents a perspective view of a portion of the reinforce.

The same reference characters indicate the same parts in all the figures.

In the drawings, *a* represents a rubber body, and *b* represents a reinforce or plug inserted in the body before vulcanization. The reinforce is composed of a sheet or piece of frictioned fabric which is disposed in deep corrugations, the folds or bends 3 of which form the top and bottom surfaces of the plug. The intermediate portions 4 of the corrugations are parallel with each other and are pressed closely against each other. The frictioning solution of unvulcanized rubber is applied to the fabric before it is corrugated, so that when the corrugations are pressed together the rubber after vulcanization binds the corrugations firmly together. The rubber body and the plug are vulcanized simultaneously, the plug being united to the body by the vulcanizing process. It will be seen that the plug has ribbed inner and outer surfaces. The ribbed inner surface of the plug effectively engages the material of the body which enters the grooves between the folds or ribs, so that a firm and durable union is established between the plug and body. The ribbed outer surface before the plug is worn away sufficiently to remove the ribs constitutes an effective anti-slipping tread-surface. After the ribs are worn away the ends of the threads running crosswise of the corrugations are presented at the tread-surface. When the plug is applied to a sole, as shown at the left in Fig. 3, the corrugations preferably extend crosswise of the sole, this arrangement making the sole more flexible than it would be if the corrugations were arranged longitudinally. The warp-threads of the fabric, or those extending crosswise of the corrugations, are preferably thicker than the weft-threads. End portions of the relatively thick warp-threads are exposed on the tread-surface after the outer folds or ridges have been worn away. It is obvious, however, that the warp and weft threads may be of the same size.

I claim—

1. A tread comprising a rubber body and a wear-resisting frictional reinforce composed of frictioned textile fabric folded to form corrugations and vulcanized to the body, the folds of the fabric being united by vulcanization.

2. A tread comprising a rubber body and a wear-resisting frictional reinforce composed of a sheet of frictioned textile fabric disposed in parallel folds or corrugations the sides of which are united by vulcanization and are arranged edgewise relatively to the tread-surface, the said reinforce being vulcanized to the body.

3. A tread comprising a rubber body and a wear-resisting frictional reinforce composed of frictioned textile fabric folded to form corrugations and vulcanized to the body, the folds being united by vulcanization and the reinforce so disposed that the corrugations extend crosswise of the tread-surface.

In testimony whereof I have affixed my signature in presence of two witnesses.

PHILIP W. PRATT.

Witnesses:
C. F. BROWN,
E. BATCHELDER.